(12) United States Patent
Levy

(10) Patent No.: US 7,530,554 B2
(45) Date of Patent: May 12, 2009

(54) FLUID SPRING ASSEMBLY AND METHOD

(75) Inventor: Daniel I. Levy, High Beech (GB)

(73) Assignee: BFS Diversified Products, LLC, Indianapolis, IN (US)

( * ) Notice: Subject to any disclaimer, the term of this patent is extended or adjusted under 35 U.S.C. 154(b) by 369 days.

(21) Appl. No.: 11/370,307

(22) Filed: Mar. 8, 2006

(65) Prior Publication Data

US 2007/0210550 A1 Sep. 13, 2007

(51) Int. Cl.
*F16F 9/04* (2006.01)
*F16M 1/00* (2006.01)

(52) U.S. Cl. ...................... 267/64.27; 267/35
(58) Field of Classification Search .... 267/64.19–64.27
See application file for complete search history.

(56) References Cited

U.S. PATENT DOCUMENTS

| | | | |
|---|---|---|---|
| 5,060,916 A | | 10/1991 | Koschinat |
| 5,941,510 A | * | 8/1999 | Grass et al. ............... 267/64.27 |
| 6,070,861 A | * | 6/2000 | Ecktman ...................... 60/778 |
| 6,113,081 A | * | 9/2000 | Hilburger et al. ........ 267/64.27 |
| 6,234,460 B1 | * | 5/2001 | Arnold ......................... 267/35 |
| 6,460,836 B1 | * | 10/2002 | Trowbridge .............. 267/64.27 |

FOREIGN PATENT DOCUMENTS

| | | |
|---|---|---|
| DE | 198 11 982 A1 | 9/1999 |
| EP | 0 296 445 A2 | 12/1988 |
| EP | 0 864 453 A1 | 9/1998 |
| EP | 1 300 264 A2 | 4/2003 |
| WO | WO 00/70238 A | 11/2000 |
| WO | WO 02/35113 A | 5/2002 |

\* cited by examiner

*Primary Examiner*—Christopher P Schwartz
(74) *Attorney, Agent, or Firm*—Sarah M. Jabbari; Fay Sharpe LLP

(57) ABSTRACT

A fluid spring assembly includes a first end member and a second end member spaced from the first end member. A spring sleeve extends between the first and second end members. A third end member is disposed along the second end member and is axially displaceably secured thereto. The third end member engages the spring sleeve and is displaceable between a fully-assembled use condition and a fully-assembled adjustment condition in which the third end member and spring sleeve are disassociated with the second end member permitting approximately free rotation thereof. A method includes adjusting the rotational alignment of the fluid spring assembly.

20 Claims, 3 Drawing Sheets

FLUID SPRING ASSEMBLY AND METHOD

BACKGROUND

The present disclosure broadly relates to the art of spring devices and, more particularly, to a fluid spring assembly having end members that can be quickly and easily repositioned relative to one another without the use of tools or instruments, as well as a method of adjusting the same.

The present novel concept finds particular application and use in association with vehicle suspension systems and will be shown and described herein with specific reference thereto. However, it is to be understood that the present novel concept is capable of broad use in a wide variety of applications and environments, such as machinery mounting applications, for example. As such, reference herein to specific applications and/or uses is merely exemplary and is not intended to be limiting.

Fluid spring assemblies using a compressed gas medium, such as air, for example, are well known and commonly used as components of vehicle suspension systems, as an example of one of the many uses and applications of such devices. Fluid spring assemblies are known to be constructed in a variety of configurations and arrangements, including those having convoluted bellows and those having rolling-lobe sleeves, for example. Typically, a fluid spring assembly that includes a convoluted bellows will also include opposing end members that are permanently secured thereto. As such, the end members of the convoluted bellows spring assembly are normally rotationally fixed relative to one another. Therefore, the desired positioning or alignment of any features or components on the opposing end members must normally be established by the manufacturer during assembly. This can lead to inefficiencies and increased costs and/or inventory levels where a variety of mounting configurations of a given model of fluid spring assembly are requested and/or used.

As compared with bellows-type assemblies, fluid spring assemblies that utilize rolling-lobe sleeves often have constructions that can be at least partially disassembled. One advantage of such arrangements is that same can be constructed in a manner that permits the upper end member and the lower end member or piston to be rotated or otherwise repositioned relative to one another. As a result, the fluid spring assemblies can be manufactured in a common orientation and later adjusted, such as by a customer or user, for example, to meet the orientational mounting requirements of the particular use or application.

As an example, a vehicle manufacturer may use the same basic fluid spring assembly on several different models of vehicle, but with each vehicle model having slightly different mounting alignment and/or orientation for the fluid spring assembly. One option in such situations, is for the vehicle manufacturer to procure and store a quantity of fluid suspension assemblies, such as permanently configured bellows-type assemblies, for each different mounting configuration. As an alternative, the vehicle manufacturer could procure and store a greater quantity of fluid suspension assemblies, such as rolling-lobe type assemblies, having a single alignment configuration. The alignment of the fluid spring assemblies can then be adjusted on a as needed or other basis.

One difficulty with such an approach, however, is that known fluid spring assemblies typically require some amount of disassembly to make the adjustments. This normally requires the use of tools and equipment. Additionally, significant time and effort are often required to reconfigure a quantity of fluid spring assemblies. This undesirably increases the costs associated with the use of such fluid spring assemblies.

As such, it is believed desirable to develop fluid spring assemblies that capable of being quickly and easily realigned without the need for tools and/or other equipment.

BRIEF SUMMARY

A fluid spring assembly in accordance with one exemplary embodiment of the present novel concept is provided that includes a first end member and a second end member spaced from the first end member. The second end member includes a first end wall and an opening extending through the first end wall. A flexible sleeve that includes an axis and a sleeve wall extends between first and second open ends. The sleeve wall toward the first open end thereof is secured on the first end member. The sleeve wall toward the second open end thereof is disposed along the first end wall of the second end member. A third end member is supported on the second end member along the first end wall with at least a portion of the sleeve wall toward the second open end thereof disposed between the third end member and the first end wall of the second end member. A retainer extends into the opening and is displaceable therealong. The retainer secures the third end member on the second end member such that the third end member and the sleeve wall can be axially displaced to disengage the third end member and the sleeve wall from the second end member thereby permitting relative rotational movement therebetween.

A fluid spring assembly in accordance with another exemplary embodiment of the present novel concept is provided for use on an associated vehicle having an associated first structural component and an associated second structural component spaced from and displaceable relative to the associated first structural component. The associated first and second structural components respectively having associated first and second mounting portions. The fluid spring assembly including a first end member securable on the associated first mounting portion of the associated first structural component. A second end member is spaced from the first end member and includes a first end wall, an opposing second end wall and a passage extending through the first end wall. The second end member is disposed along the associated second structural component such that the second end wall is toward the associated second mounting portion. A spring sleeve includes an axis and a sleeve wall formed from an elastomer material. The sleeve wall extends between opposing open ends with one of the open ends secured on the first end member and the other of the open ends disposed along the first end wall of the second end member. A third end member is supported on the second end member and extends along the sleeve wall at least partially within the open end thereof such that at least a portion of the sleeve wall extends between the second and third end members. The third end member is secured along the first end wall of the second end member such that the second end member is axially displaceable relative to the third end member and the spring sleeve. The second end member is rotatable relative to the first end member in the axially displaced condition permitting rotational alignment of the second end member with the associated second mounting portion of the associated second structural components.

A method of adjusting rotational alignment of a fluid spring assembly in accordance with the present novel concept is provided and includes providing a fluid spring assembly transformable between a fully-assembled use condition and a fully-assembled adjustment condition. The fluid spring assembly includes a first end member and a second end member spaced from the first end member and disposed in a first rotational alignment relative thereto. The second end member includes a first end wall. A spring sleeve includes an axis and a sleeve wall extending between opposing open ends. The spring sleeve is secured on the first end member and is disposed along the first end wall of the second end member. A third end member disposed along the first end wall of the second end member and engaging the spring sleeve. The third end member is axially displaceably secured on the second end member such that in the fully-assembled one condition the spring sleeve and the third end member are in abutting engagement with the first end wall of the second end member and in the fully-assembled adjustment condition the spring sleeve and the third end member are approximately free from contact with the first end wall of the second end member. The method also includes placing the fluid spring assembly into the fully-assembled adjustment condition, adjusting the second end member into a second rotational alignment relative to the first end member, and returning the fluid spring assembly to the fully-assembled use condition.

DETAILED DESCRIPTION

Figure 1:
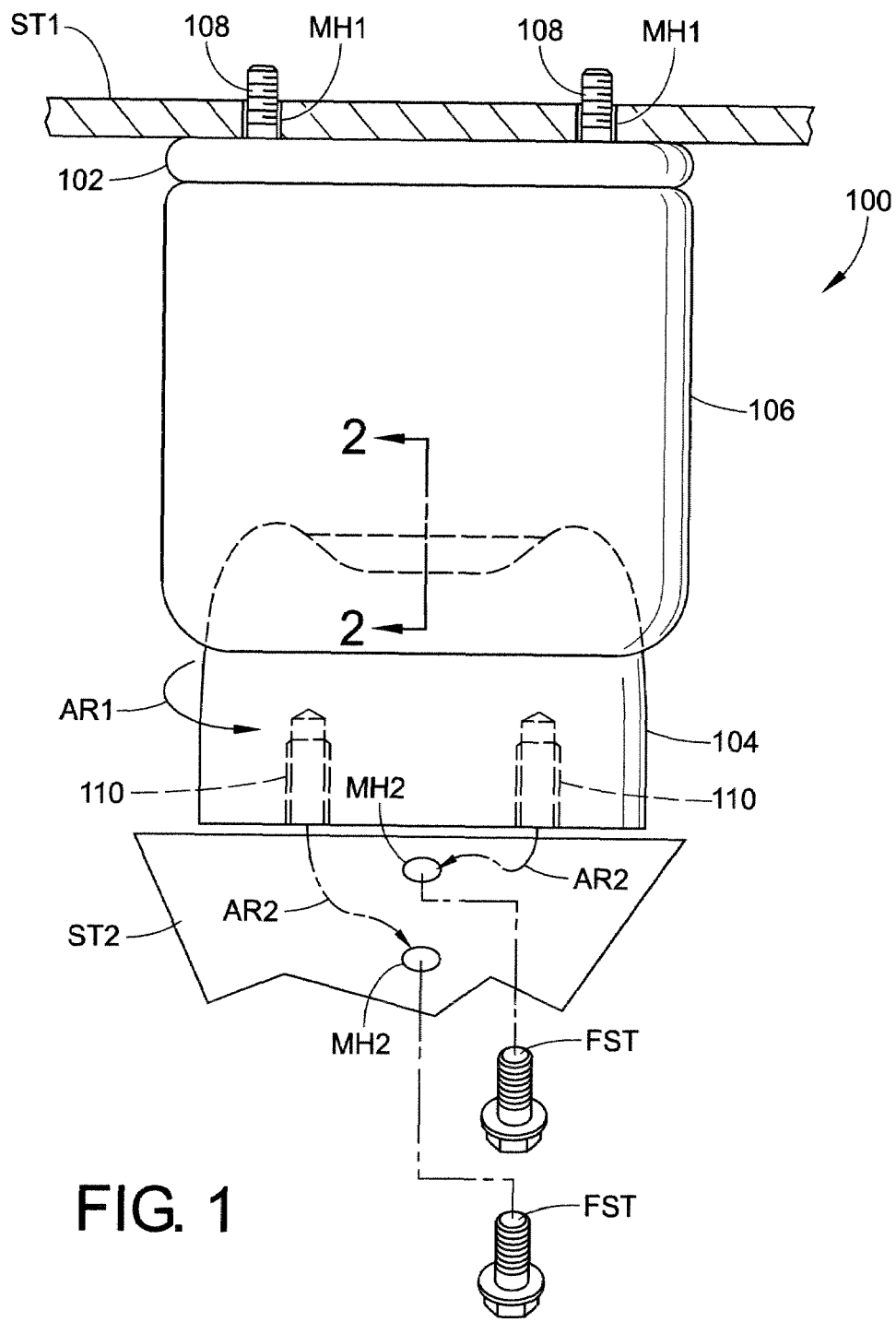
FIG. 1 is an exploded side view of one exemplary embodiment of a fluid spring assembly in accordance with the present novel concept.

Referring now in greater detail to the drawings, wherein the showings are for the purposes of illustrating exemplary embodiments of the subject novel concept only, and not for the purpose of limiting the same, FIG. 1 illustrates a fluid spring assembly 100 supported between associated structural components ST1 and ST2, such as a body or frame and a wheel-engaging member of an associated vehicle, for example. The associated structural components include mounting portions having suitable features for mounting or otherwise securing a fluid spring assembly thereon. As an example of suitable mounting features, mounting holes MH1 are provided on associated structural component ST1 and mounting holes MH2 are provided on associated structural component ST2. It will be recognized that mounting holes MH1 and MH2 are disposed at two different orientations with mounting holes MH1 being spaced apart across the drawing figure and mounting holes MH2 being spaced apart along the length of the drawing figure. It will be appreciated, however, that the orientation shown and described is merely exemplary and that any other suitable orientation or alignment could alternately be accommodated.

Fluid spring assembly 100 includes a first or upper end member 102, a second or lower end member 104, and a spring sleeve 106 supported therebetween and at least partially defining a spring chamber (not shown). First end member 102 is shown in FIG. 1 as including mounting components suitable for securing the first end member on a structural component, such as associated structural component ST1, for example. In the exemplary embodiment shown in FIG. 1, the mounting components include mounting studs 108 that engage mounting holes MH1 in associated structural component ST1 and can be secured thereon in any suitable manner, such as by using a threaded nut (not shown), for example. However, it will be appreciated that any suitable components or arrangement can additionally or alternately be used. Second end member 104 is shown as including mounting features for securing the second end member on a structural component, such as associated structural component ST2, for example. In the exemplary embodiment shown, the mounting features include threaded holes 110, though it will again be recognized that any other suitable components or arrangement could additionally or alternately be used.

As provided in FIG. 1, fluid spring assembly 100 is arranged such that mounting studs 108 and threaded holes 110 are approximately aligned with one another, which is illustrated by the studs and holes being spaced apart across the drawing figure. However, mounting holes MH2 of associated structural component ST2 are disposed in a different orientation. Thus, in the orientation that is shown threaded holes 110 will not properly align with mounting holes MH2 to receive threaded fasteners FST and thereby secure second end member 104 on associated structural component ST2. To align threaded holes 110 with mounting holes MH2, second end member 104 is rotated approximately 90 degrees, as indicated by arrow AR1. After such a realignment, the threaded holes will align with mounting holes MH2, as indicated by arrows AR2, and can receive threaded fasteners FST. It will be appreciated that the mounting arrangements shown and described herein are merely exemplary and that any other suitable components or features could additionally or alternately be used.

As discussed above, bellows-type fluid spring assemblies are permanently assembled, such as by rolling the edge of the end member around a bead formed on the end of the bellows, for example. Thus, this type of fluid spring assembly is typically incapable of being realigned. Certain configurations of rolling lobe-type fluid spring assemblies are similarly permanently assembled, such as by securing opposing ends of the spring sleeve on the end members using crimped rings or bands. However, other configurations of rolling lobe-type fluid springs are secured together using removable fasteners along at least one end of the spring sleeve. Such configurations normally utilize a third end member, which is also referred to in the art as an end closure. The third end member is at least partially disposed within an open end of the spring sleeve and is secured to the second end member or piston using a fastener. Normally, the third end member is tightly secured to the second end member thereby capturing a portion of the sleeve wall between the second and third end members. In such arrangements, the third end member is secured tightly to the second end member and cannot move axially relative thereto. Additionally, the contact of the sleeve wall with the second end member due at least in part to the loading from the third end member generates substantial frictional forces which prevent any substantial rotation of the second end member from occurring. As such, known fluid spring assemblies require at least partial disassembly for rotation of the second end member to be permitted. Furthermore, these known fluid spring assemblies once disassembled for adjustment must then be reassembled prior to use.

Figure 2:
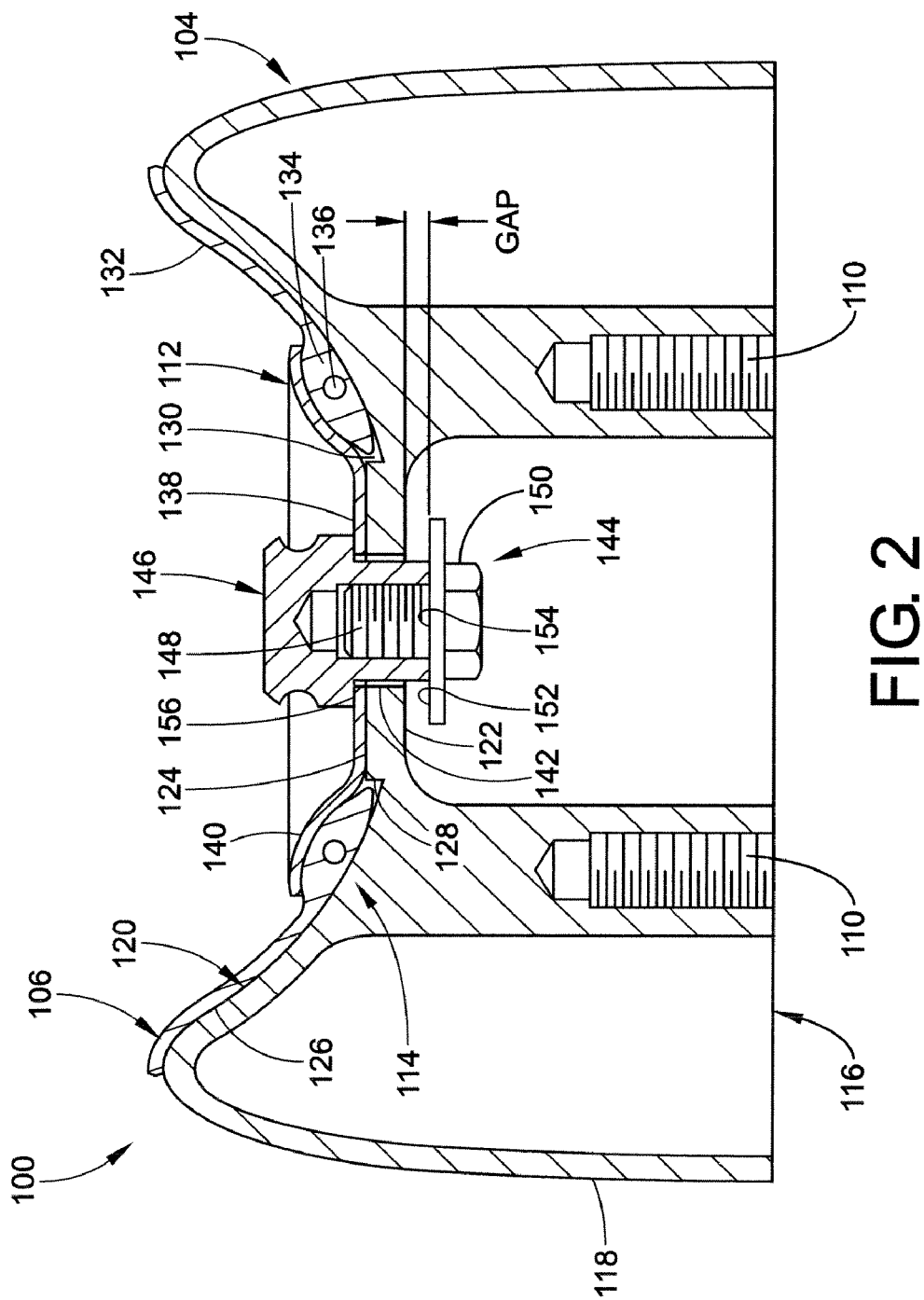
FIG. 2 is a cross-sectional side view of a portion of the fluid spring assembly in FIG. 1 taken along line 2-2 and shown in a fully-assembled use condition.
Figure 3:
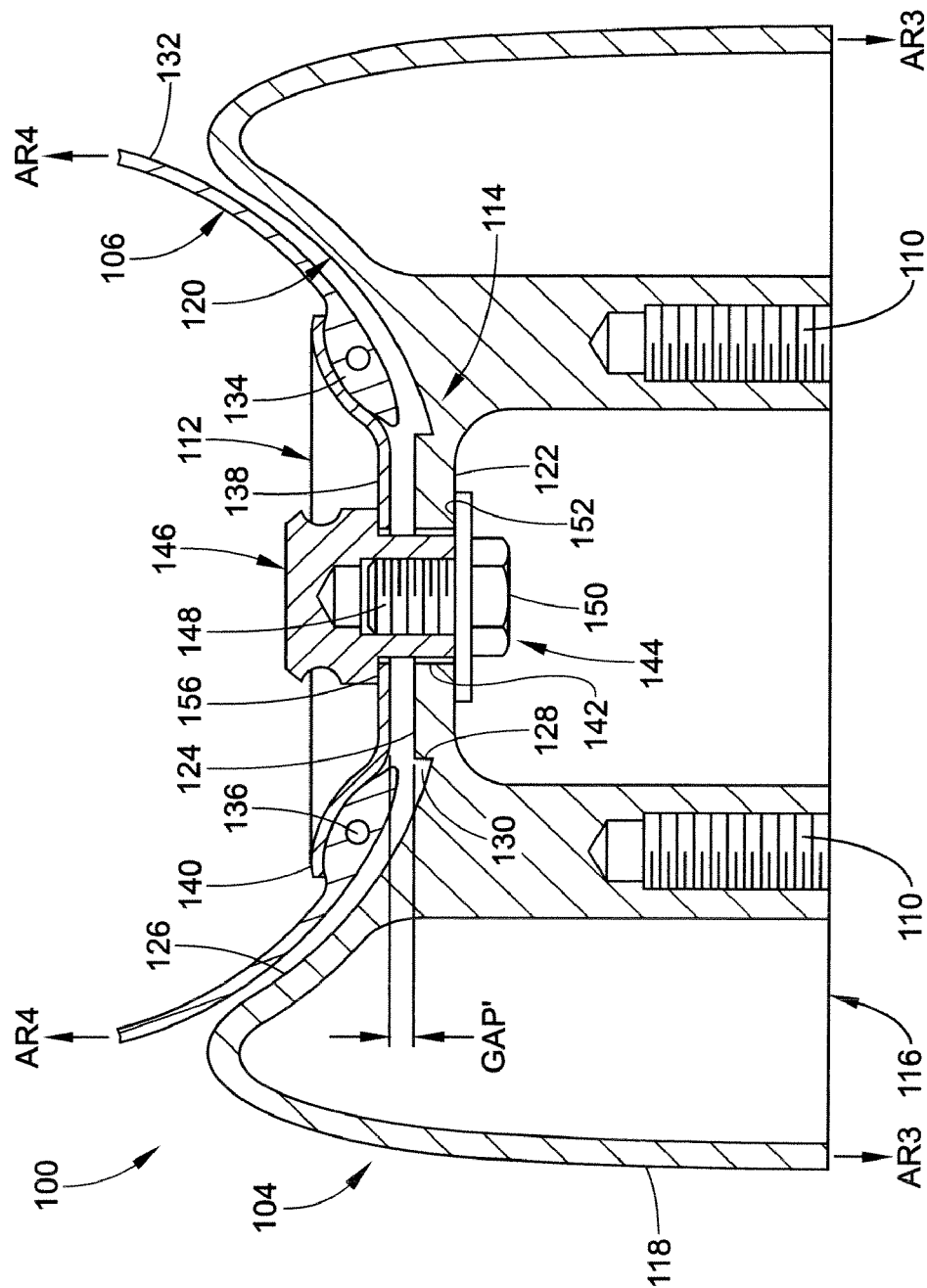
FIG. 3 is a cross-sectional side view of the portion of the fluid spring assembly in FIG. 2 shown in a fully-assembled adjustment condition.

With reference now to FIGS. 2 and 3, fluid spring assembly 100 differs from known fluid spring assemblies in that a third end member 112 is supported on second end member 104 in a manner that permits some axial movement relative thereto. This axial movement relieves any resistance to rotation due to frictional forces between the spring sleeve and second end member. Additionally, any frictional resistance due to contact between the second and third end members is also substantially if not entirely relieved.

Second end member 104 includes a first end wall 114 and an opposing second end wall 116. Second end member 104 is shown and described herein as having an outwardly curved side wall 118. However, it will be appreciated that any configuration or arrangement of side wall can alternately be used. Preferably, second end wall 116 includes at least one approximately planar portion for seating on the associated structural component. First end wall 114 includes opposing first and second sides 120 and 122. First side 120 includes a substantially central and approximately planar portion 124, and a radially outwardly disposed non-planar portion 126. In the exemplary embodiment shown, non-planar portion 126 is curvilinear. However, any other suitable shape or configuration can alternately be used. Central portion 124 extends or projects axially outwardly from non-planar portion 126 at least partially forming an approximately cylindrical side wall 128 that at least partially defines a relief 130 between third end member 112 and non-planar portion 126.

Spring sleeve 106 includes a sleeve wall 132 and extends between opposing open ends (not numbered), only one of which is shown in FIGS. 2 and 3. A mounting bead 134 is formed on sleeve wall 132 toward at least one open end thereof, and can optionally include a reinforcing cord 136 or other suitable feature. Third end member 112 includes a central and approximately planar portion 138, and a radially outwardly extending portion 140. In the fully-assembled use condition shown in FIG. 2, central portion 138 is disposed along central portion 124 of second end member 104. Additionally, radially outward portion 140 is disposed along sleeve wall 132, such as along mounting bead 134, for example, so that the sleeve wall is disposed between the second and third end members.

As mentioned above, third end member 112 and spring sleeve 106 are axially displaceable relative to second end member 104 and it is to be understood that such operation can be achieved in any suitable manner and by using any suitable arrangement or configuration of components and/or features. In the exemplary embodiment shown, a passage or opening 142 extends through first end wall 114 of second end member 104. A retainer, such as a fastener 144, for example, extends through passage 142 and threadably engages a bumper stud 146. In the exemplary embodiment shown, bumper stud 146 extends through a hole (not numbered) in third end member 112 and through passage 142, and projects outwardly below second side 122 of first end wall 114. Fastener 144 includes an elongated post 148 and a head 150 having a head surface 152 disposed toward second side 122 of first end wall 114. Fastener 144 threadably engages bumper stud 146 such that head surface 152 engages end wall 154 of the bumper stud, which fully secures the bumper stud and fastener together. However, end wall 154 projects beyond second side 122 of first end wall 114 generating a gap GAP between head surface 152 and second side 122. Bumper stud 146 includes a shoulder 156 formed thereon that is seated on third end member 112 along the hole (not numbered) formed therein. In another alternative arrangement, a shorter bumper stud and an elongated shoulder bolt could be used, for example. As still another example, an extended fastener and separate spacer sleeve could be used to extend through the passage in the first end wall and engage a threaded portion formed on the third end member. As such, it will be appreciated that a variety of other arrangements and combinations of components could alternately be used and that such other arrangements and use are intended to fall within the scope and intent of the present novel concept.

Due to the provision of gap GAP between head surface 152 and second side 122 of first end wall 114, third end member 112 and spring sleeve 106 can be displaced from second end member 104 approximately the same distance as the gap, as indicated by gap GAP' in FIG. 3. Additionally, it will be recognized from FIG. 3 that head surface 152 is in contact with second side 122 of first end wall 114. This displacement can be accomplished in any suitable manner, such as by tensioning or otherwise extending the fluid spring assembly. For example, a force could be applied by hand on second end member 104, such as by pulling the end member, for example, as indicated by arrow AR3. Such an action would tension spring sleeve 106 as indicated by arrows AR4, pulling the sleeve wall away from non-planar portion 126 of first end wall 114 and disengaging central portion 138 of third end member 112 from central portion 124 of the first end wall. Under such a fully-assembled adjustment condition, second end member 104 is free to rotate relative to first end member 102, spring sleeve 106 and third end member 112. By releasing the tension or load on the fluid spring assembly, the same can be collapsed into the fully-assembled use condition.

Optionally, it may be desirable to provide suitable sealing members, such as o-rings, for example, along or in operative association with the retainer or fastener 144 or elsewhere to form a substantially fluid-tight seal on or along a passage, such as passage 142, for example. However, it is believed that by closely fitting the retainer, passage and/or other components and features that the use of such optional sealing members can be avoided. Thus, it will be appreciated that the enlarged clearances illustrated in FIGS. 2 and 3 are exaggerated for purposes of clarity. Additionally, it will be further understood that any realignment that is performed on a fluid suspension assembly in accordance with the present novel concept will be performed while the assembly is uninflated. However, once properly aligned, installed and inflated, the fluid pressure within the spring chamber (not shown) will act on the third end member and sleeve wall in a manner that tends to improve the sealing therebetween. Thus, it is believed that no significant fluid loss will result from a fluid spring assembly constructed and/or operated in accordance with the present novel concept.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. A fluid spring assembly comprising:
a first end member;
a second end member spaced from said first end member and including a first end wall and an opening extending through said first end wall;
a flexible sleeve including an axis and a sleeve wall extending between first and second open ends, said sleeve wall toward said first open end secured on said first end member and said sleeve wall toward said second open end disposed along said first end wall of said second end member;
a third end member supported on said second end member along said first end wall with at least a portion of said sleeve wall toward said second open end disposed between said third end member and said first end wall of said second end member; and, a retainer extending at least partly into said opening and displaceable therealong, said retainer securing said third end member on said second end member such that:

in a fully-assembled use condition, at least one of said third end member and said sleeve wall is in abutting engagement with said first end wall of said second end member; and, in a fully-assembled adjustment condition, said third end member and said sleeve wall are axially displaced from said second end member such that said third end member and said sleeve wall are disengaged from said second end member thereby permitting relative rotational movement therebetween.

2. A fluid spring assembly according to claim 1, wherein said first end wall includes a first side and an opposing second side, said first side including an approximately planar wall portion and a curvilinear wall portion disposed radially outwardly of said approximately planar wall portion.

3. A fluid spring assembly according to claim 2, wherein said approximately planar wall portion projects axially outwardly from said curvilinear wall portion.

4. A fluid spring assembly according to claim 2, wherein said retainer includes a retainer head and an elongated post extending therefrom, said retainer head disposed adjacent said second side of said first end wall and in spaced relation thereto such that an axially extending gap is formed between said retainer head and said second side of said first end wall.

5. A fluid spring assembly according to claim 4 further comprising a bumper stud supported on said third end member, said elongated post of said retainer extending through said opening and engaging said bumper stud thereby securing said third end member on said second end member.

6. A fluid spring assembly according to claim 5, wherein said elongated post includes a plurality of external threads and said bumper stud includes a passage and a plurality of internal threads, and said elongated post threadingly engages said bumper stud.

7. A fluid spring assembly for an associated vehicle having an associated first structural component and an associated second structural component spaced from and displaceable relative to the associated first structural component, the associated first and second structural components respectively having associated first and second mounting portions, said fluid spring assembly comprising:

a first end member securable on the associated first mounting portion of the associated first structural component;

a second end member spaced from said first end member and including a first end wall, an opposing second end wall and a passage extending through said first end wall, said second end member disposed along the associated second structural component such that said second end wall is toward the associated second mounting portion;

a spring sleeve including an axis and a sleeve wall formed from an elastomeric material, said sleeve wall extending between opposing first and second ends with said first open end secured on said first end member and said second end disposed along said first end wall of said second end member; and, a third end member supported on said second end member and extending along said sleeve wall at least partially across said second end thereof such that at least a portion of said sleeve wall extends between said second and third end members;

said third end member secured along said first end wall of said second end member such that said second end member is axially displaceable relative to said third end member and said spring sleeve between a fully-assembled use condition in which at least one of said sleeve wall and said third end member is in abutting engagement with said first end wall of said second end member and a fully-assembled adjustment condition in which said sleeve wall and said third end member are spaced from said first end wall of said second end member; and, said second end member being rotatable relative to said first end member in said fully-assembled adjustment condition which permits rotational alignment of said second end member with the associated second mounting portion of the associated second structural component.

8. A fluid spring assembly according to claim 7, wherein said third end member includes a central wall portion and an outer wall portion;

in said fully-assembled use condition, said central wall portion being in abutting engagement with said first end wall of said second end member; and, in said fully-assembled adjustment condition, said central wall portion being spaced from said first end wall of said second end member.

9. A fluid spring assembly according to claim 8, wherein said outer wall portion of said third end member is in abutting engagement with said sleeve wall in both said fully-assembled use condition and said fully-assembled adjustment condition.

10. A fluid spring assembly according to claim 7, wherein said first end wall of said second end member includes a first wall portion and a second wall portion extending radially outwardly from said first wall portion, said third end member disposed along said first wall portion and said sleeve wall disposed along said second wall portion.

11. A fluid spring assembly according to claim 10, wherein said first wall portion is approximately planar and said second wall portion is curvilinear.

12. A fluid spring assembly according to claim 11, wherein first wall portion projects axially from said second wall portion at least partially forming an approximately cylindrical side wall between said first wall portion and said second wall portion.

13. A fluid spring assembly according to claim 7 further comprising a retainer extending through said passage in said first end wall of said second end member and at least partially securing said third end member on said second end member.

14. A fluid spring assembly according to claim 13, wherein said retainer includes a retainer head supported in spaced relation to said first end wall of said second end member forming a gap therebetween.

15. A method of adjusting rotational alignment of a fluid spring assembly, said method comprising:

a) providing a fluid spring assembly having a fully-assembled use condition and a fully-assembled adjustment condition, said fluid spring assembly including:

a first end member;

a second end member spaced from said first end member and disposed in a first rotational alignment relative thereto, said second end member including a first end wall;

a spring sleeve including an axis and a sleeve wall extending between opposing open ends, said spring sleeve secured on said first end member and disposed along said first end wall of said second end member; and, a third end member disposed along said first end wall of said second end member and engaging said spring sleeve;

said third end member axially displaceably secured on said second end member such that in said fully-assembled use condition said spring sleeve and said third end member are in abutting engagement with said first end wall of said second end member and in said fully-assembled adjustment condition said spring sleeve and said third end member are approximately free from contact with said first end wall of said second end member;

b) placing said fluid spring assembly into said fully-assembled adjustment condition;

c) adjusting said second end member into a second rotational alignment relative to said first end member; and, d) returning said fluid spring assembly to said fully-assembled use condition.

16. A method according to claim 15, wherein said fluid spring assembly is operatively associated with a vehicle having a first structural component and a second structural component spaced from the first structural component, said method further comprising securing said first end member to the first structural component and securing said second end member to said second structural component after adjusting said second end member in c).

17. A method according to claim 15, wherein placing said fluid spring assembly into said fully-assembled adjustment condition in b) includes disengaging said spring sleeve and said third end member from said second end member thereby permitting rotational movement thereof.

18. A method according to claim 17, wherein disengaging said spring sleeve and said third end member includes axially extending said fluid spring assembly to at least partially axially separate said spring sleeve and said third end member from said second end member.

19. A method according to claim 15, wherein returning said fluid spring assembly to said fully-assembled use condition in d) includes engaging said spring sleeve and said third end member with said second end member.

20. A method according to claim 19, wherein engaging said spring sleeve and said third end member includes axially collapsing said fluid spring assembly.

\* \* \* \* \*